United States Patent [19]
Mullaly et al.

[11] Patent Number: 5,883,628
[45] Date of Patent: Mar. 16, 1999

[54] CLIMABILITY: PROPERTY FOR OBJECTS IN 3-D VIRTUAL ENVIRONMENTS

[75] Inventors: John Martin Mullaly; Didier Daniel Claude Bardon, both of Austin; Richard Edmond Berry; Scott Harlan Isensee, both of Georgetown; Shirley Lynn Martin, Austin, all of Tex.

[73] Assignee: International Business Machines Corporation, Armonk, N.Y.

[21] Appl. No.: 887,806

[22] Filed: Jul. 3, 1997

[51] Int. Cl.⁶ .................................................. G06F 3/00
[52] U.S. Cl. ............................................................ 345/355
[58] Field of Search .................................... 345/355, 357

[56] References Cited

U.S. PATENT DOCUMENTS

| | | | |
|---|---|---|---|
| 5,502,638 | 3/1996 | Takenaka | 364/424.02 |
| 5,577,981 | 11/1996 | Jarvik | 482/4 |
| 5,584,700 | 12/1996 | Feldman et al. | 482/247 |
| 5,594,644 | 1/1997 | Hasegawa et al. | 364/424.027 |
| 5,737,533 | 4/1998 | de Hond | 395/357 X |

OTHER PUBLICATIONS

Spinney, L., "Seeing is unfreezing," New Scientist V. 153, Feb. 1997, p. 38–40.

Jacobson, J., "Collision avoidance in virtual environments," 1997 IEEE Int. Conf. on SMC pp. 1704–1709.

*Primary Examiner*—A. Katbab
*Attorney, Agent, or Firm*—Paul Kraft

[57] ABSTRACT

The problem addressed by this invention is that of resolving what occurs when a user's viewpoint comes into contact with an object residing in a three-dimensional workspace as the viewer navigates through that workspace. There are several possibilities in such a situation. For example, the viewer's viewpoint may be stopped and prevented from advancing further or it may penetrate the object. The instant invention provides a climbability property for objects in 3-D virtual environments. This property, when stored in the software along with the properties which define that object, can alter the viewer's viewpoint such that it will automatically be adjusted to simulate the behavior of climbing over the object.

17 Claims, 9 Drawing Sheets

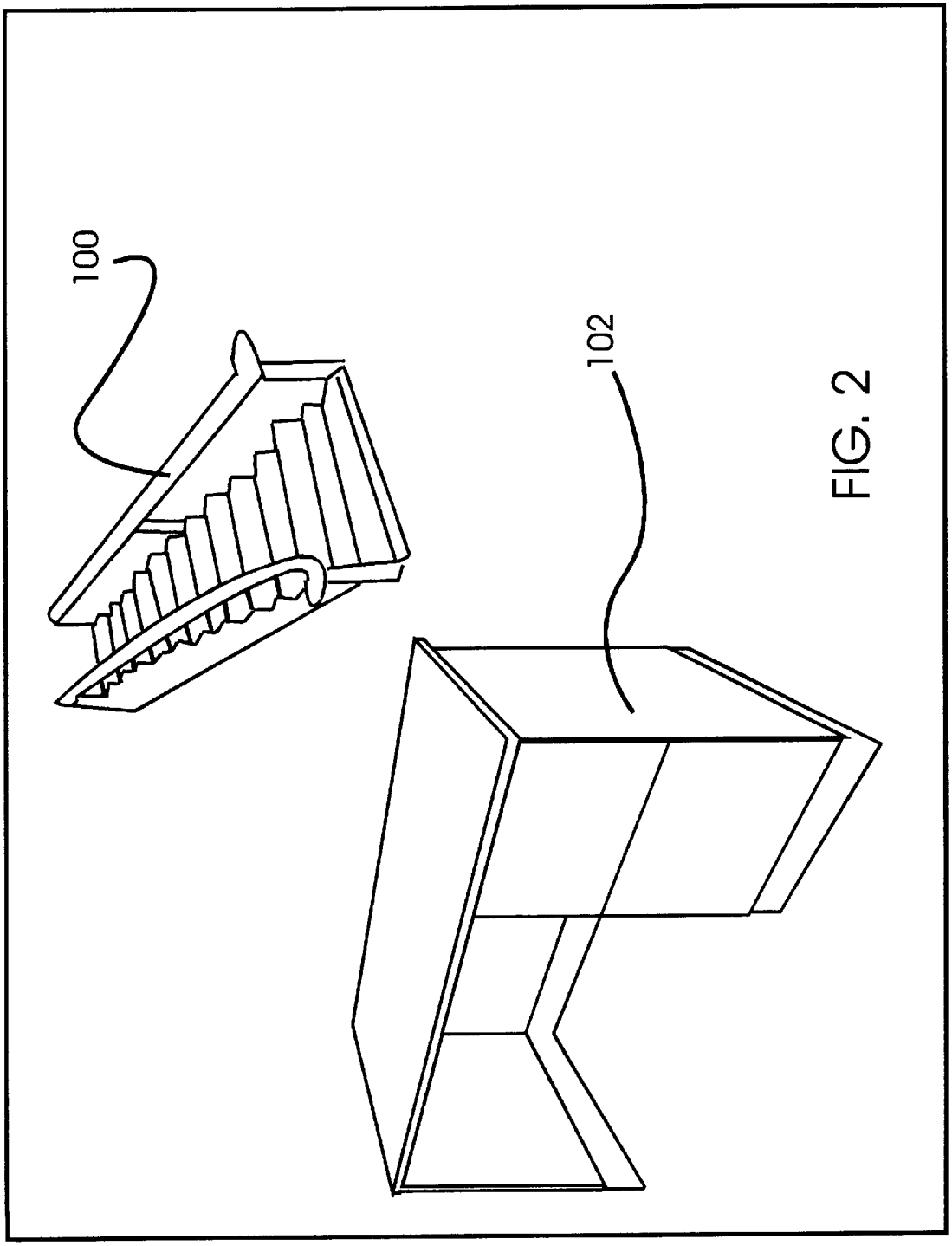

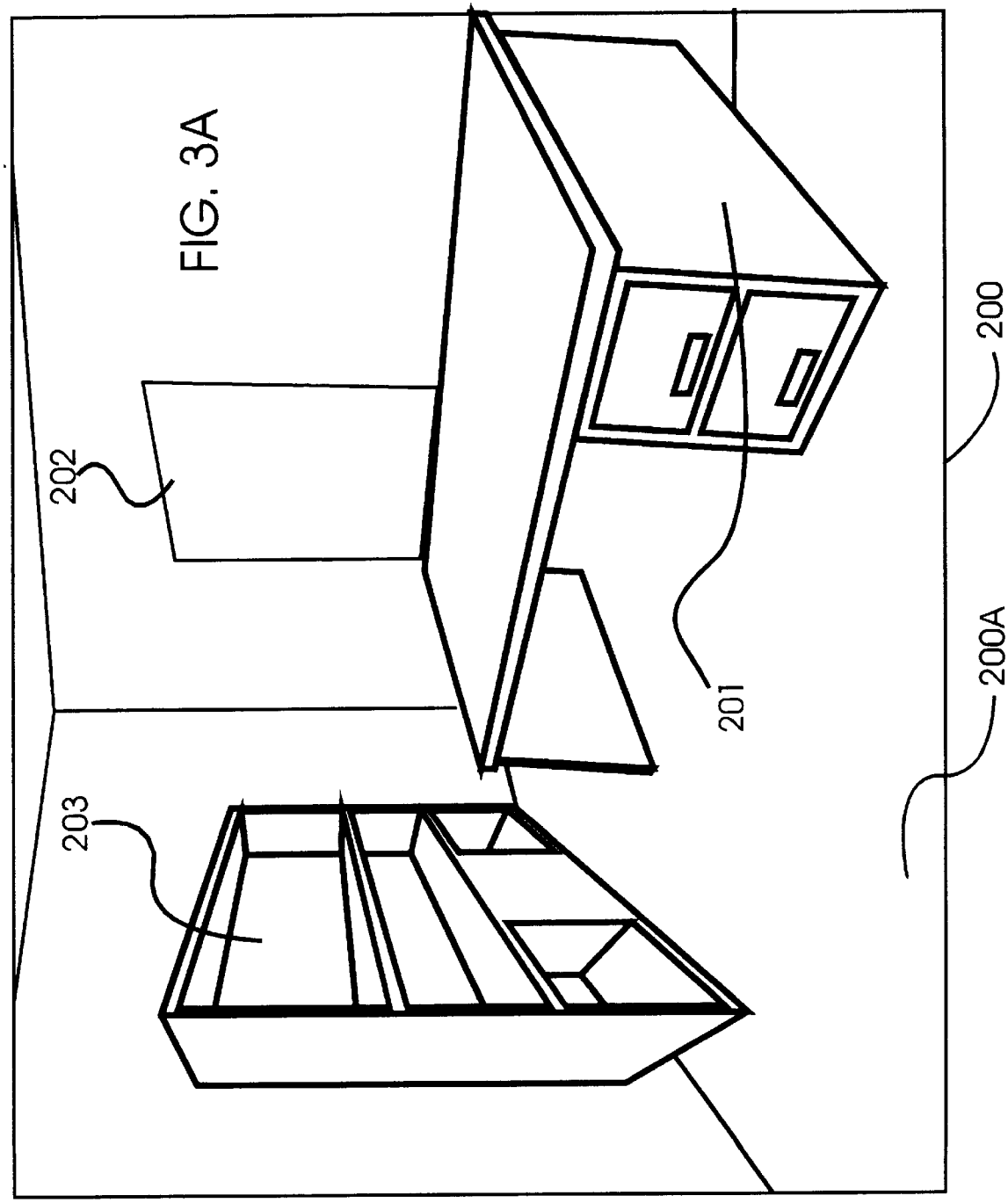

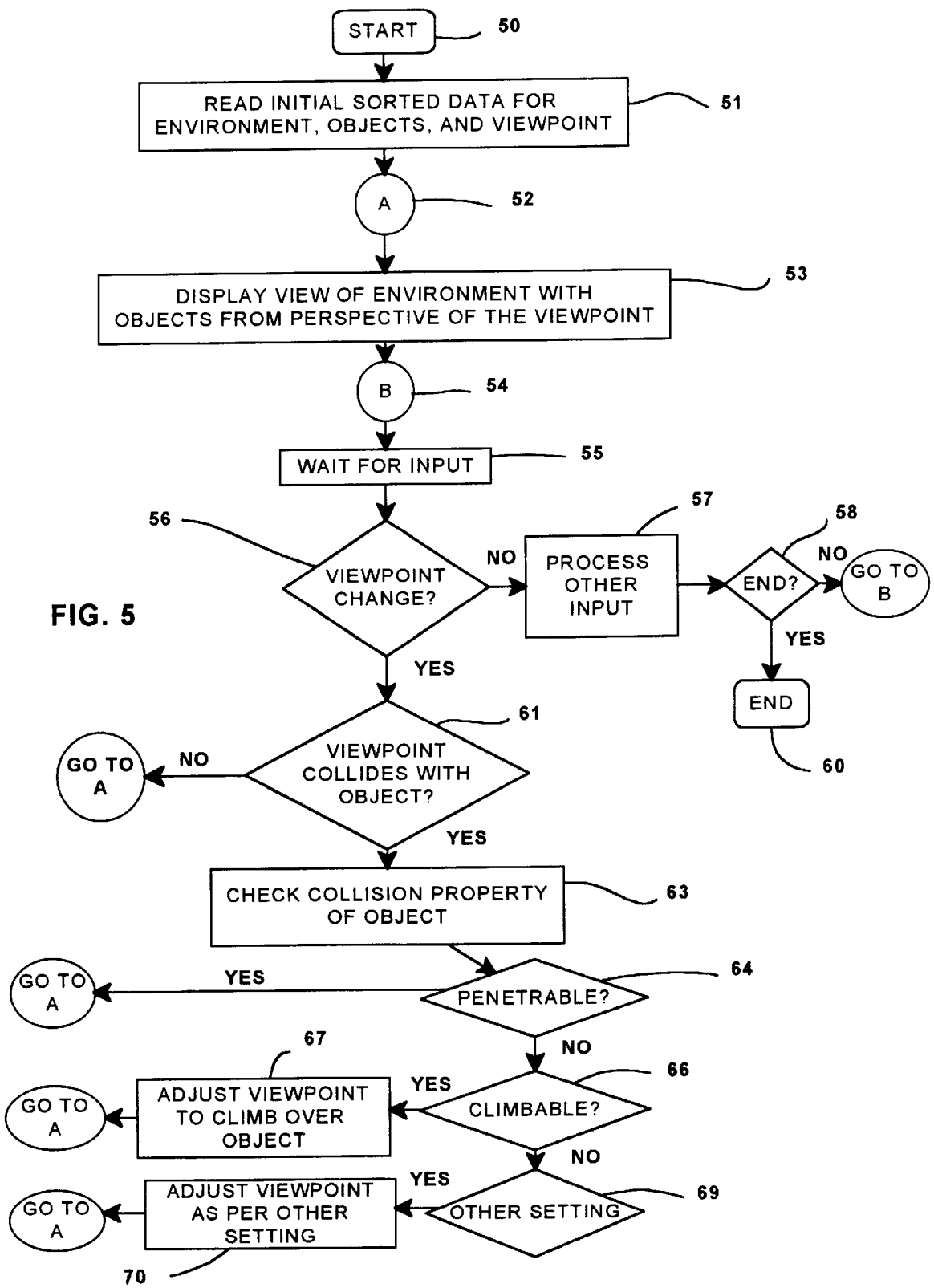

CLIMABILITY: PROPERTY FOR OBJECTS IN 3-D VIRTUAL ENVIRONMENTS

TECHNICAL FIELD

The present invention relates to user interactive computer supported display technology and particularly to such user interactive systems and methods which are user friendly, i.e. provide even noncomputer literate users with an interface environment which is easy to use and intuitive.

BACKGROUND OF THE INVENTION AND PRIOR ART

The 1990's decade has been marked by a societal technological revolution driven by the convergence of the data processing industry with the consumer electronics industry. This advance has been even further accelerated by the extensive consumer and business involvement in the internet over the past two years. As a result of these changes, it seems as if virtually all aspects of human endeavor in the industrialized world requires human-computer interfaces. As a result of these profound changes, there is a need to make computer directed activities accessible to a substantial portion of the world's population which, up to a year or two ago, was computer-illiterate, or at best computer indifferent. In order for the vast computer supported market places to continue and be commercially productive, it will be necessary for a large segment of computer indifferent consumers to be involved in computer interfaces. Thus, the challenge of our technology is to create interfaces to computers which are as close to the real world as possible.

Industry has been working towards this challenge and there is presently a relatively high degree of realism possible in interfaces. This presents a need and an opportunity for even more realistic interaction techniques to better match the visual metaphors used and to achieve a higher level of ease of use for computer systems. We are striving towards the representation of object as photo realistic, three-dimensional (3D) models rather than as the icons and two-dimensional desktops of conventional computer technology.

Some examples of current technology for the creation of virtual three-dimensional workspace display interfaces are copending application Ser. No. 08/753,081, entitled "CREATING REAL WORLD OBJECTS" and Ser. No. 08/753,076, entitled "SYSTEM AND METHOD FOR MAINTAINING SIZE AND POSITION RELATIONSHIPS FOR NONRECTANGULAR REAL WORLD OBJECTS", assigned to the Assignee of the present application.

A 3D virtual workspace display environment is also described in an article entitled, "RAPID CONTROLLED MOVEMENT THROUGH A VIRTUAL 3D WORKSPACE", Jock Mackinlay et al., *Computer Graphics Publication*, Vol. 24, No. 4, August 1990, pp. 171–175, as well as in its related U.S. Pat. No. 5,276,785.

A more recent copending application assigned to the Assignee of the present invention is Ser. No. 08/813,891, entitled, "VIEWER INTERACTIVE OBJECT IN VIRTUAL THREE-DIMENSIONAL WORKSPACE", D. Bardon et al., which covers face views of virtual three-dimensional objects which may be triggered to appear on a display by interactive viewer input.

It is clear that current technology in virtual three-dimensional workspaces has provided environments which are user friendly, i.e. make the casual computer user feel more comfortable and at home with the interface. However, researchers in human factors have found downsides to three-dimensional virtual reality displays. Because of the many choices that the user has in wandering down various "streets and roads" or visiting a wide variety of "buildings or stores" or going through many possible "doors", the user may wander through this reality and perhaps get lost from the track or goal he is pursuing.

The present invention addresses this problem, i.e. that of helping the interactive user in three-dimensional graphic environments to stay focused and relate to the objects he is seeking to relate to in the manner he is seeking to relate to such objects even when these objects are arranged in 3D space in what appears to be infinite configurations. This invention also facilitates the design of 3-D environments which then facilitate the tasks of the end users.

In these virtual reality 3D environments as in the real world, the viewer or user is relating to the virtual objects in order to carry out a wide variety of tasks, some of which are quite simple and some very complex. In order for the user to stay focused and carry out his tasks as expeditiously as possible, it would be optimum for the virtual 3D system to provide simpler user interfaces for simple tasks and more comprehensive user interfaces for more complex tasks.

Thus, when the viewer's task is a simple one such as getting more information about a current movie film or about a newly released music CD, the user may be presented with his information in an interface as simple as a face view of a virtual 3D object which contains the information. For example, in the virtual 3D world or workspace, the viewer may navigate to a virtual three-dimensional object of a theater and get his desired movie film information from a face view of the object which presents a marquee of the theater. Similarly, the viewer seeking CD information might navigate to and be presented with a face view of a virtual CD vending kiosk which presents him with his desired information. The above-mentioned patent application, "VIEWER INTERACTIVE OBJECT IN VIRTUAL THREE-DIMENSIONAL WORKSPACE", D. B. Bardon et al., describes such face views of 3D virtual objects. With such simple tasks, the viewer notes his desired information, perhaps makes some simple choices and moves on with his navigation through the virtual 3D workspace.

On the other hand, the navigating viewer's task may be a more complex one like tracking and updating product sales information of a business or group of businesses or within a report or filing a tax statement.

SUMMARY OF THE INVENTION

Before setting forth the present invention, we should establish some basic characteristics of the virtual three-dimensional environment as described in the above-referenced patents and applications. It is understood that in order to navigate through three-dimensional space, view the space or relate to objects within the space, a viewpoint is determined within that space. That viewpoint is the virtual position of the viewer or person who is navigating within the three-dimensional space. The viewpoint is commonly defined by its position and its orientation or direction. For purposes of describing this invention, we will use the metaphor of a camera to understand the viewpoint. The camera's position and orientation are where it is and which way it is pointing. Let us refer to another property of a viewpoint which is "field of view"; this is effectively the resulting view from a given viewpoint. A key need of a viewer navigating through virtual three-dimensional space is to stay focused.

As set forth above, it is easier to stay focused when the task for which he is accessing the object is a simple one. The present invention deals with helping viewers to stay focused in more complex tasks.

The present invention operates within the previously described data processor controlled display system for displaying a virtual three-dimensional object having three-dimensional objects which are interactively functional, i.e. may be picked by the viewer or user for various computer interactive functions.

The present invention specifically provides the designer and/or user with a means of dealing with a situation wherein the viewer's viewpoint is confronted with an object in a 3-D virtual reality environment as they navigate through 3-D space. How do they deal with such a situation. This invention provides a mechanism for resolving this dilemma.

In three dimensional (3D) graphical environments, objects are arranged in three dimensional space and the users move through the space by moving their viewpoint within that space. Movement within 3D space which contains objects is an aspect human-computer interaction which presents many problems or challenges to the usability of software with 3D interfaces.

The specific problem addressed by this invention is that of resolving what occurs when a user's viewpoint and any embodiment attached to the viewpoint in the virtual space, such as a camera, vehicle or avatar, comes into contact with any of the objects residing in a 3-D environment. There are several possibilities in such a situation, such as, the viewpoint may be stopped and prevented from advancing further. Other possibilities are that it may be deflected away from the object, it may be allowed to penetrate the object or as described in the specifics of the instant invention it may climb up and over the object.

The instant invention provides a "climbability" property for objects in 3-D virtual environments. This property could then be set either by designers of 3-D objects or by users themselves. With such a property setting, when the user's viewpoint comes into contact with the object, the viewpoint will automatically be adjusted to simulate the behavior of climbing over the object.

In today's 3D virtual environments, the resolution of what happens when the user's viewpoint comes in contact with objects is handled in a variety of ways. This includes stopping the movement of the viewpoint, deflecting the viewpoint, allowing the viewpoint to penetrate the object, or as the instant "climbability" invention demonstrates, having the viewpoint climb over the object. However currently there is no means provided to the user or to designers of objects for virtual environments, which would allow them to control the climbability behavior of specific objects. There is no mechanism that would support climbability as a property of an object which may be controlled by a designer and or user and is independent of the user or the user's chosen navigation mechanism.

The inventors believe that their solution is novel and the best solution to the problem. By this is meant the ability of being able to have the designers of objects for a 3-D environment, and or users of these environments, to control what happens when the user's viewpoint comes into contact with objects. Additionally, it allows them to specify that the object is "climbable" so that the viewpoint is automatically adjusted to simulate the effect of "climbing" over the object.

BRIEF DESCRIPTION OF THE DRAWINGS

FIG. 2 shows examples of two unrelated objects in virtual 3 dimensional workspace,they are a desk and a stair case to another landing.

FIG. 3A through 3C demonstrate that the property of "penetrability" of the virtual 3 dimensional object, such as a desk. Thus the user's path of navigation to the door involves penetration through the desk. The trajectory of the viewpoint toward the door, is unaffected by the presence of the desk.

FIG. 5 is a flowchart for the process implemented by the present invention for creating the effect of a climbing means to adjust the viewpoint, when the user's viewpoint comes into contact with an object in virtual 3-D space. As a result, the viewpoint will automatically be adjusted to simulate the behavior of climbing over the object to reach the desired 3-D object.

DETAILED DESCRIPTION OF THE PREFERRED EMBODIMENT

Figure 1:
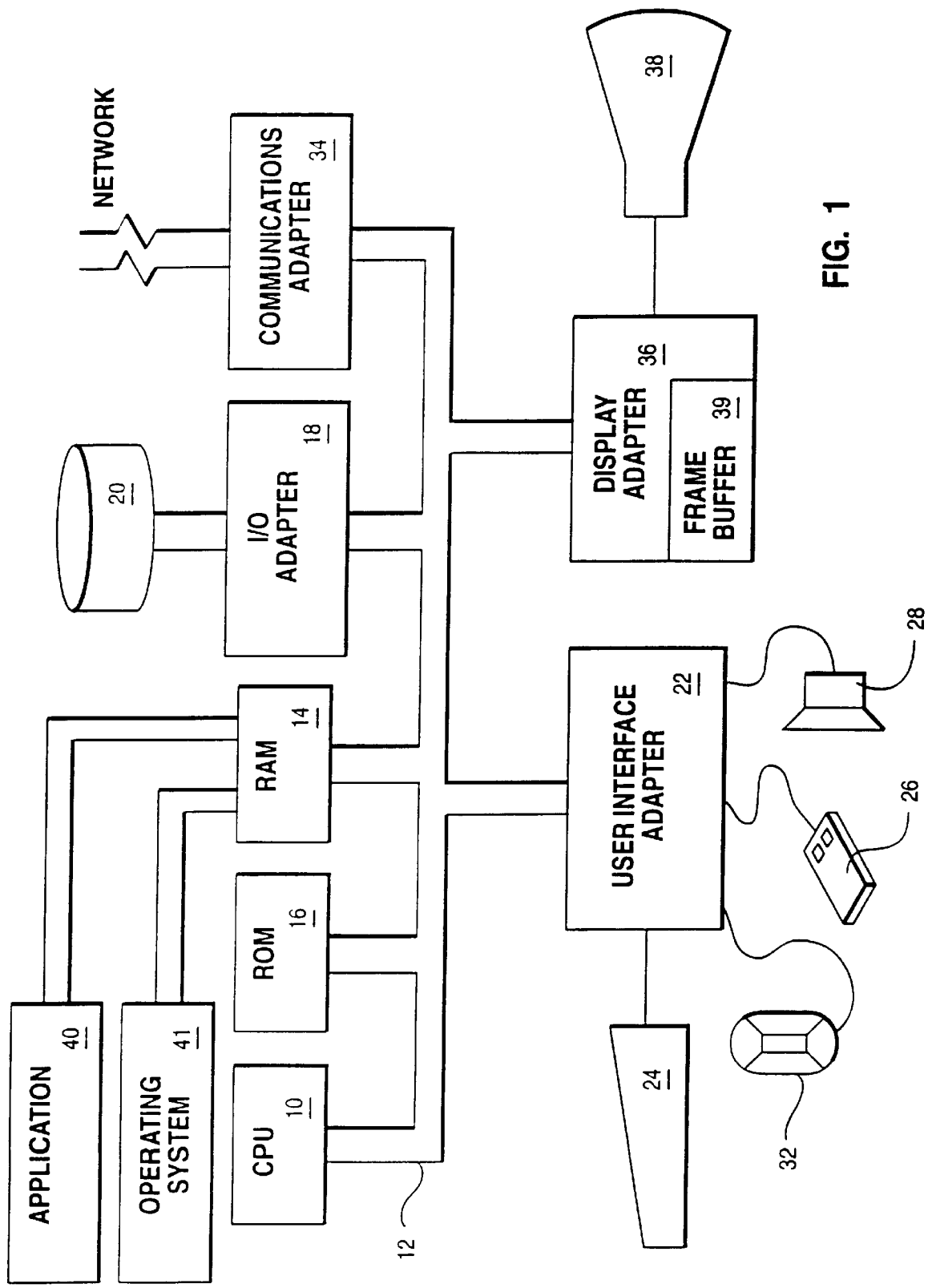
FIG. 1 is a block diagram of a data processing system including a central processing unit which is capable of implementing the present invention.

Before going into the details of specific embodiments, it will be helpful to understand from a more general perspective the various elements and method which may be used to implement the present invention. The present invention is implemented in three-dimensional virtual workspace. A three-dimensional workspace is a workspace that is perceived as extending in three orthogonal directions. Typically a display has a two-dimensional display surface and the perception of a third dimension is effected by visual clues such as perspective lines extending toward a vanishing point. Distant objects are obscured by nearer objects. The three-dimensional effect is also provided by showing changes in objects as they move toward or away from the viewer. Perspective shading of objects and a variety of shadowing of objects at different distances from the viewer also contribute to the three-dimensional effect.

A three-dimensional workspace is typically perceived as being viewed from a position within the workspace. This position is a viewpoint. This viewpoint provides the virtual interface between the display user and the display. The viewpoint's direction of orientation is the direction from the viewpoint into the field of view along the axis at the center of he field of view.

In order to present a three-dimensional workspace, a system may store data indicating "coordinates" of the position of an object, a viewpoint or other display feature in the workspace. Data indicating coordinates of a display feature can then be used in presenting the display feature so that it is perceptible as positioned at the indicated coordinates. The "distance" between two display features is the perceptible distance between them, and can be determined from their coordinates if they are presented so that they appear to be positioned at their coordinates.

Techniques for providing and handling three-dimensional objects in a three-dimensional virtual workspace have been developed in the art and are available to display user interface designers. U.S. Pat. No. 5,276,785 (Mackinlay et al., Jan. 4, 1994) is an example of the design techniques available to such three-dimensional workspace interface designers.

The description of the present invention often refers to navigation within the three-dimensional virtual workspace. The workspace or landscape is navigable using conventional three-dimensional navigation techniques. A user may move around or navigate within the three-dimensional data representation to alter his perspective and view of the displayed representation of the data. Thus, a user may be referred to as a navigator. The navigator is actually stationary, and his view of the display space changes to give him the sensation of moving within the three-dimensional graphical space. Thus, we speak in terms of the navigator's perceived motion when we refer to changes in his view of the display space. As the user moves, his view of the data changes accordingly within the three-dimensional data representation. Some navigation modes include browsing, searching and data movement. U.S. Pat. No. 5,555,354 (Strasnick et al., Sep. 10, 1996) describes some known navigation techniques.

The three-dimensional objects which will be subsequently described in embodiments of the present invention may be best implemented using object oriented programming techniques, such as the object oriented techniques described in the above-mentioned copending application Ser. No. 08/753,076 assigned to the Assignee of the present invention. The objects of that copending application are implemented using the C++ programming language. C++ is a compiled language.

The programs are written in human readable script and this script is provided to another program called a compiler to generate a machine readable numeric code which can be loaded into, and directly executed by the computer. The C++ language possesses certain characteristics which allow a software developer to easily use programs written by others while still providing a great deal of control over the reuse of programs to prevent their destruction or improper use. The C++ language is well known and many articles and text are available which describe the language in detail.

While the embodiment of the present invention, which will be subsequently described, can be implemented using object oriented techniques involving the C++ programming language, we found it desirable to use SCL as used in VRT: the Virtual Reality Toolkit developed and marketed by Superscape Ltd. having U.S. offices in Palo Alto, Calif. Extensive details of these programming techniques may be found in the Superscape VRT, Reference Manual, Version 4-00, 2d Edition, Jan. 29, 1996.

It should be understood by those skilled in the art that object oriented programming techniques involve the definition, creation, use and instruction of "objects". These objects are software entities comprising data elements and routines, or methods, which manipulate the data elements. The data and related methods are treated by the software as an entity and can be created, used and deleted as such. The data and functions enable objects to model their real world equivalent entity in terms of its attributes, which can be presented by the data elements, and its behavior which can be represented by its methods.

Objects are defined by creating "classes" which are not objects themselves, but which act as templates which instruct a compiler how to construct the actual object. For example, a class may specify the number and type of data variables and the steps involved in the functions which manipulate the data. An object is actually created in the program by means of a special function called a constructor which uses the corresponding class definition and additional information, such as arguments provided during object creation, to construct the object. Objects are destroyed by a special function called a destructor.

Many benefits arise out of three basic properties of object oriented programming techniques, encapsulation, polymorphism and inheritance. Objects can be designed to hide, or encapsulate, all or a portion of, the internal data structure and the internal functions. More particularly, during program design, a program developer can define objects in which all or some of the data variables and all or some of the related method are considered "private" or for use only by the object itself. Other data or methods can be declared "public" or available for use by other software programs. Access to the private variables and methods by other programs can be controlled by defining public methods which access the object's private data. The public methods form an interface between the private data and external programs. An attempt to write program code which directly accesses the private variables causes a compiler to generate an error during program compilation. This error stops the compilation process and presents the program from being run.

Polymorphism allows objects and functions which have the same overall format, but which work with different data, to function differently to produce consistent results. For example, an addition method may be defined as variable A+variable B, (A+B). The same format can be used whether the A and B are numbers, characters or dollars and cents. However, the actual program code which performs the addition may differ widely depending on the type of variables which comprise A and B. After the methods have been defined, a program can later refer to the addition method by its common format (A+B) and, during compilation, the compiler will determine which of the three methods to be used by examining the variable types. The compiler will then substitute the proper function code.

A third property of object oriented programming is inheritance which allows program developers to reuse pre-existing programs. Inheritance allows a software developer to define classes and the objects which are later created from them as related through a class hierarchy. Specifically, classes may be designated as subclasses of other base classes. A subclass "inherits" and has access to all of the public functions of its base classes as though these functions appeared in the subclass. Alternatively, a subclass can override some or all of its inherited functions or may modify some or all of its inherited functions by defining a new function with the same form.

The creation of a new subclass borrowing the functionality of another class allows software developers to easily customize existing code to meet their particular needs.

Although object oriented programming offers significant improvements over other programming concepts, program development still requires significant outlays of time and effort, especially if no pre-existing software programs are available for modification. Consequently, a set of predefined, interconnected classes are sometimes provided to create a set of objects and additional miscellaneous routines which are all directed to performing commonly encountered tasks in a particular environment. Such predefined classes and libraries are typically called "frameworks" and essentially provide a prefabricated structure as a basis for creating a working application program.

In object oriented programming such as the previously described VRT software platform, there is provided for the user interface a framework containing a set of predefined interface objects. The framework contains predefined classes which can be used as base classes and a developer may accept and incorporate some of the objects into these base classes, or he may modify or override objects or combinations of objects in these base classes to extend the framework and create customized solutions in particular areas of expertise.

This object oriented approach provides a major advantage over traditional programming since the programmer is not changing the original program, but rather extending the capabilities of the original program.

The above-described Superscape Virtual Reality Toolkit (VRT) provides the architectural guidance and modeling, but at the same time frees developers to supply specific actions unique to the particular problem domain which the developer is addressing.

Therefore, those skilled in the art will understand how the present invention is implemented using object oriented programming techniques as described above.

Referring to FIG. 1, a typical data processing system is shown which may be used in conjunction with object oriented software in implementing the present invention. A central processing unit (CPU), such as one of the PowerPC microprocessors available from International Business Machines Corporation (PowerPC is a trademark of International Business Machines Corporation) is provided and interconnected to various other components by system bus 12. An operating system 41 runs on CPU 10 and provides control and is used to coordinate the function of the various components of FIG. 1. Operating system 41 may be one of the commercially available operating systems such as DOS, or the OS/2 operating system available from International Business Machines Corporation (OS/2 is a trademark of International Business Machines Corporation). A program application such as the program in the above-mentioned VRT platform 40 runs in conjunction with operating system 41 and provides output calls to the operating system 41 which implements the various functions to be performed by the application 40.

A read only memory (ROM) 16 is connected to CPU 10, via bus 12 and includes the basic input/output system (BIOS) that controls the basic computer functions. Random access memory (RAM) 14, I/O adapter 18 and communications adapter 34 are also interconnected to system bus 12. It should be noted that software components including the operating system 41 and application 40 are loaded into RAM 14 which is the computer system's main memory. I/O adapter 18 may be a small computer system interface (SCSI) adapter that communicates with the disk storage device 20, i.e. a hard drive. Communications adapter 34 interconnects bus 12 with an outside network enabling the data processing system to communicate with other such systems over a local area network (LAN), wide area network (WAN), or the like. I/O devices are also connected to system bus 12 via user interface adapter 22 and display adapter 36. Keyboard 24, trackball 32, mouse 26 and speaker 28 are all interconnected to bus 12 through user interface adapter 22. Display adapter 36 includes a frame buffer 39 which is a storage device that holds a representation of each pixel on the display screen 38. Images may be stored in frame buffer 39 for display on monitor 38 through various components such as a digital to analog converter (not shown) and the like. By using the aforementioned I/O devices, a user is capable of inputting information to the system through the keyboard 24, trackball 32 or mouse 26 and receiving output information from the system via speaker 28 and display 38.

There will now be described a simple illustration of the present invention. When the images are described, it will be understood that these may be rendered by storing a virtual reality three-dimensional image creation application program 40 such as the previously described VRT of Superscape in the RAM 14 of the system of FIG. 1. Also stored on the RAM will be a suitable operating system 41 such as DOS or Windows.

An embodiment of the present invention will now be described with respect to the virtual reality workspace shown in FIG. 2; which shows examples of two unrelated objects in virtual 3 dimensional workspace which are a desk 102 and a staircase 100 to another landing. In the case of the desk 102, we will subsequently see in FIGS. 3A–C, the properties of "penetrability" and contrast this with the property of "climbability" FIGS. 4A–C, the embodiment of the instant invention.

With regard to FIG. 3A, this demonstrates several objects that exist in three-dimensional workspace 200; specifically a desk 201 and a staircase 202 and a bookcase 203. The workspace 200 FIG. 3 as noted is shown as an office environment. The workspace 200 is centered within a viewpoint interface which is presented to the viewer on display monitor 38 of FIG. 1. In accordance with conventional techniques, the user may control the viewpoint 200A through a conventional I/O device such as mouse 26 or FIG. 1 which operates through the user interface 22 of FIG. 1 to call upon VRT programs in RAM 14 operating with the operating system 41 to create the images in frame buffer 39 of display adapter 36 to control the display on monitor 38. Using conventional virtual three-dimensional workspace navigation techniques, the viewpoint interface 200A of FIG. 3A is changeable as the viewer moves closer or backs away from objects in the workspace or moves to right or to the left in the workspace. All this may be controlled by a suitable I/O device such as mouse 26 of FIG. 1. The previously mentioned images of these objects within workspace 200, as well as the object images for the staircase 304 of FIG. 4 and the door 305 of FIG. 4-C within workspace 302 FIG. 4-C, are stored as data from which the objects may be created on the display in RAM 14 of FIG. 1 in connection with the VRT program.

Figure 3B:
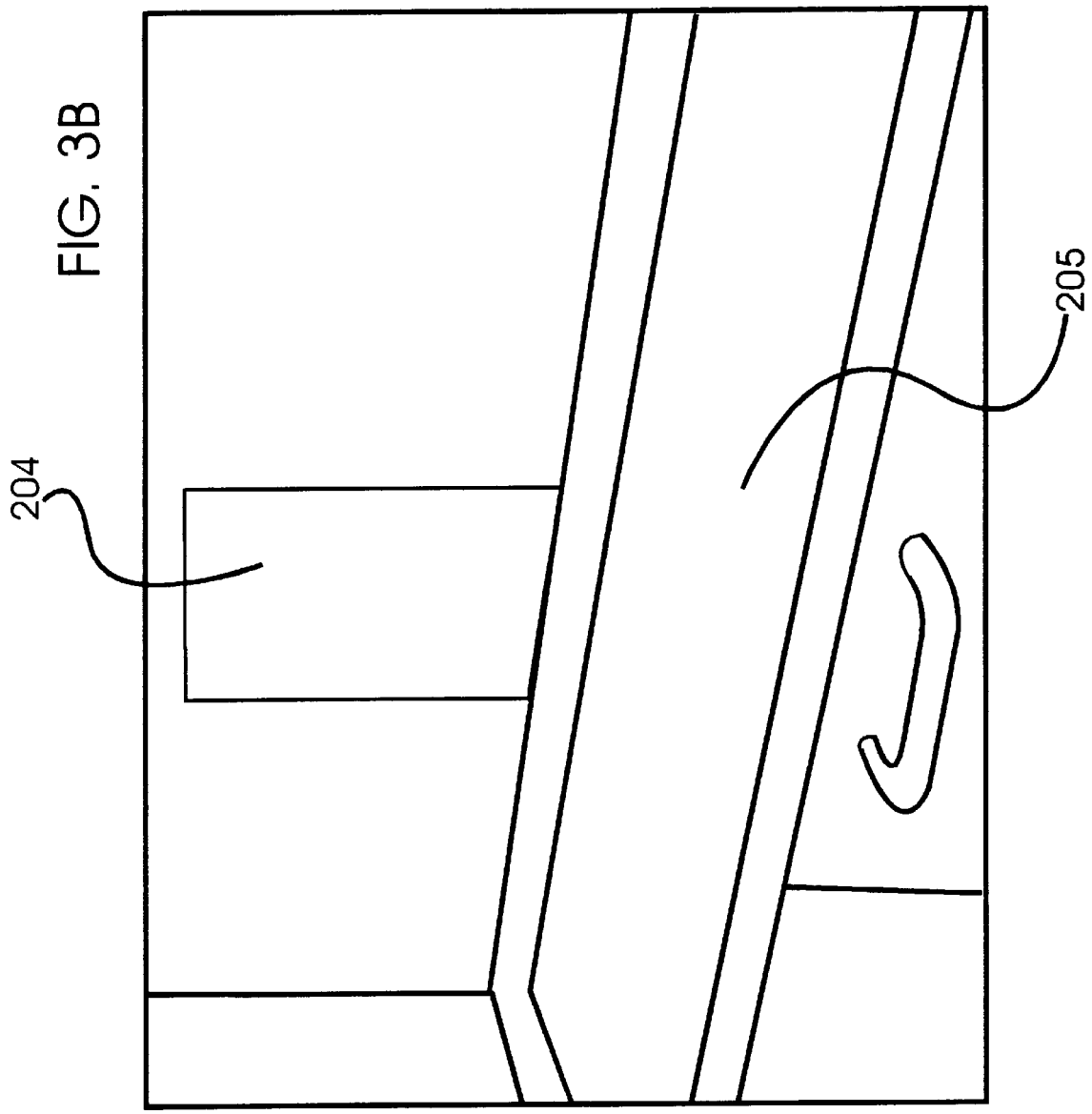
Figure 3C:
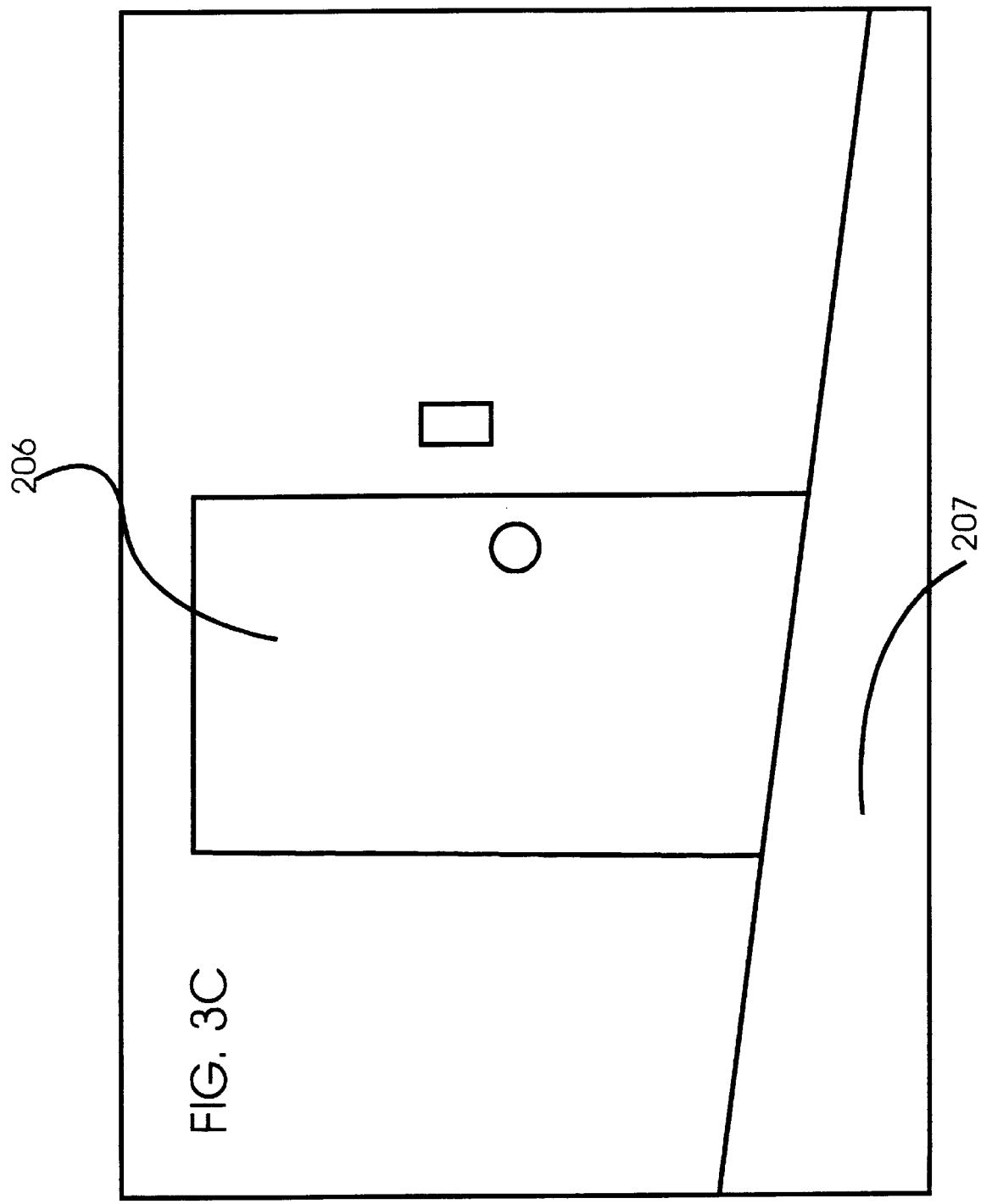
Figure 4A:
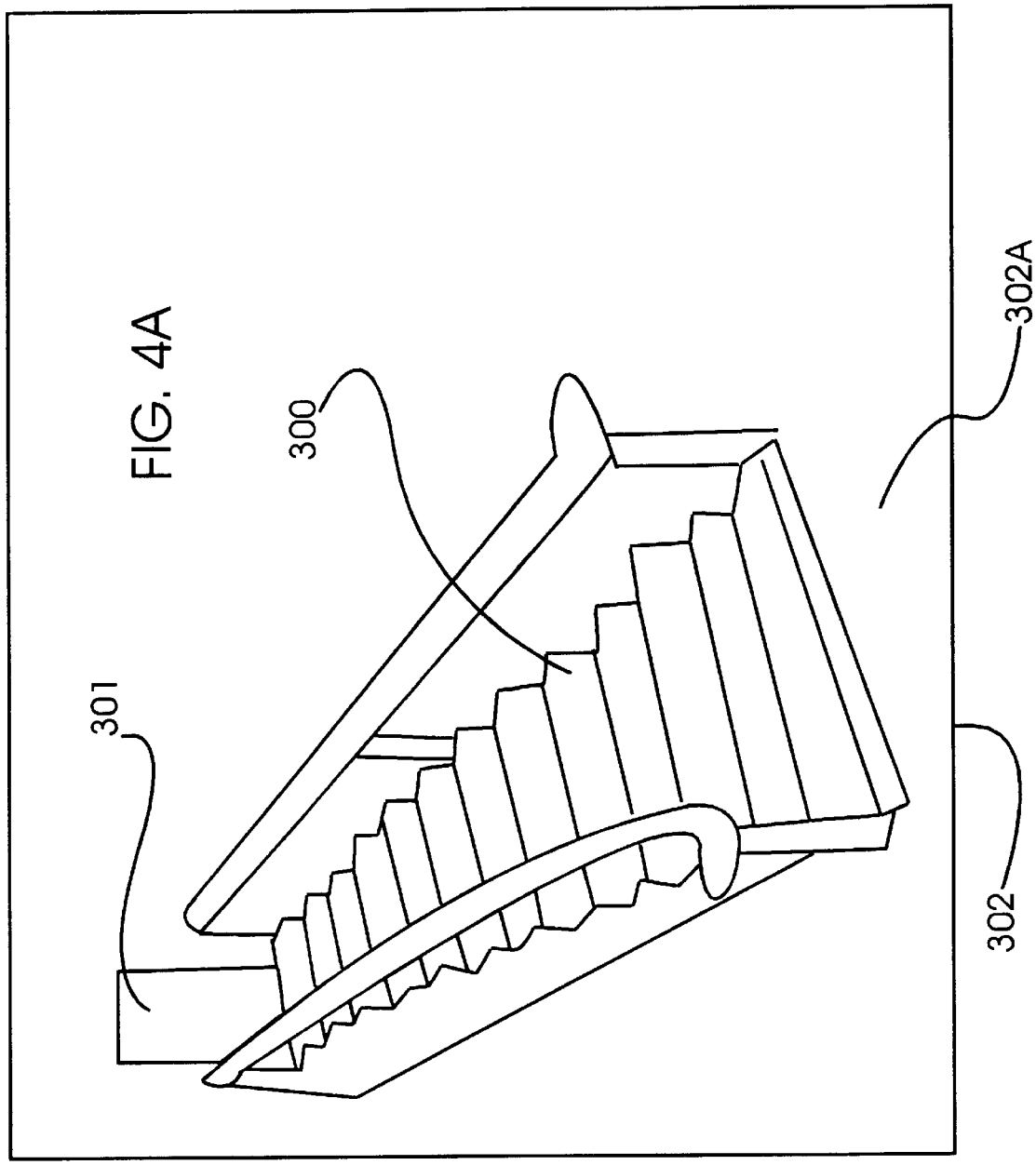
FIGS. 4A through 4C, represent the embodiment of the instant application. They demonstrate the property of "climbability" of the virtual 3 dimensional object, such as a staircase, which can be can be stored in the software along with the properties that define the object itself. Thus the user's viewpoint comes into contact with the staircase object, on the path of navigation to reach a door at the top of a staircase, the viewpoint automatically adjusts to simulate the behavior of climbing the stairs to reach the door.
Figure 4B:
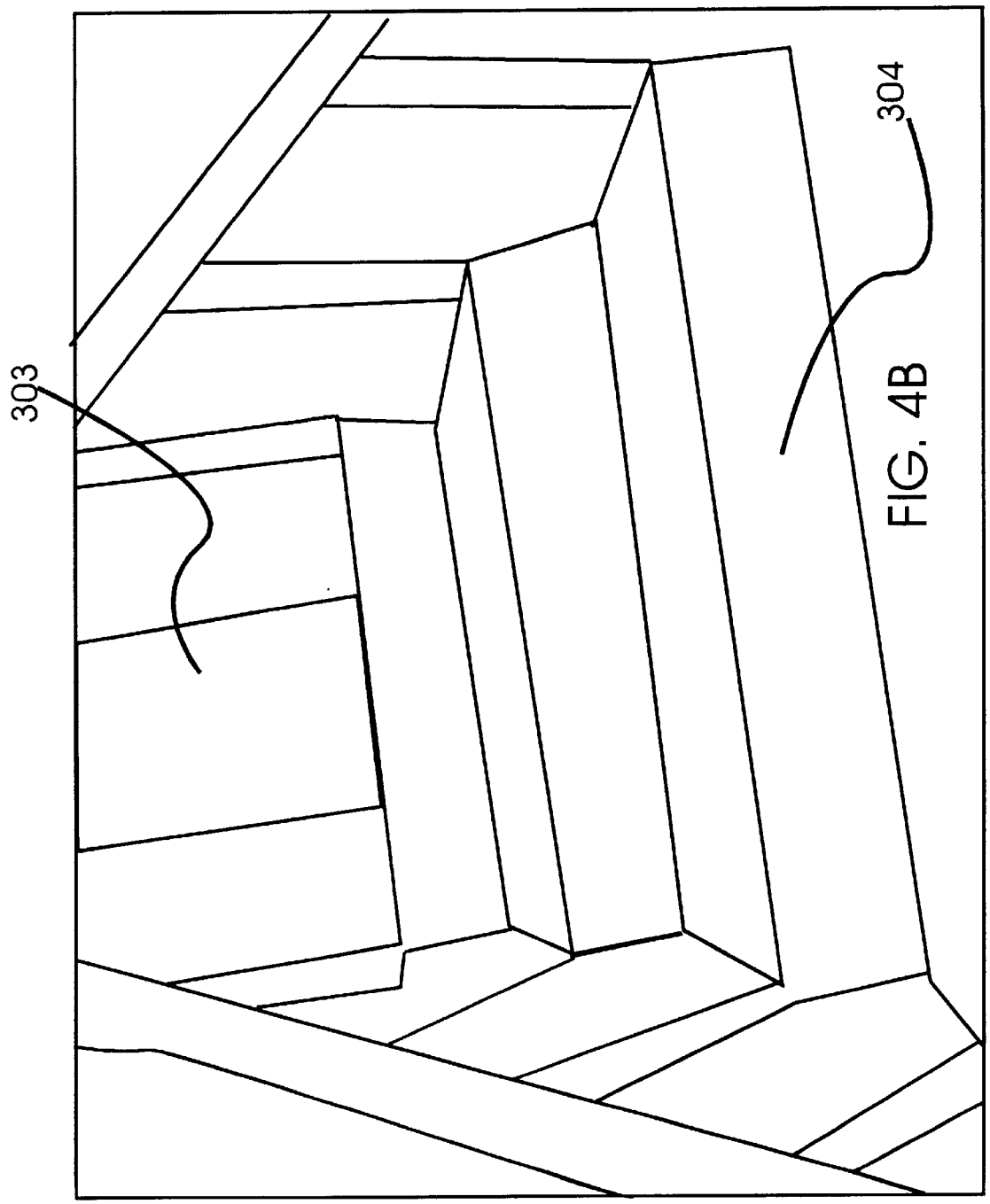
Figure 4C:
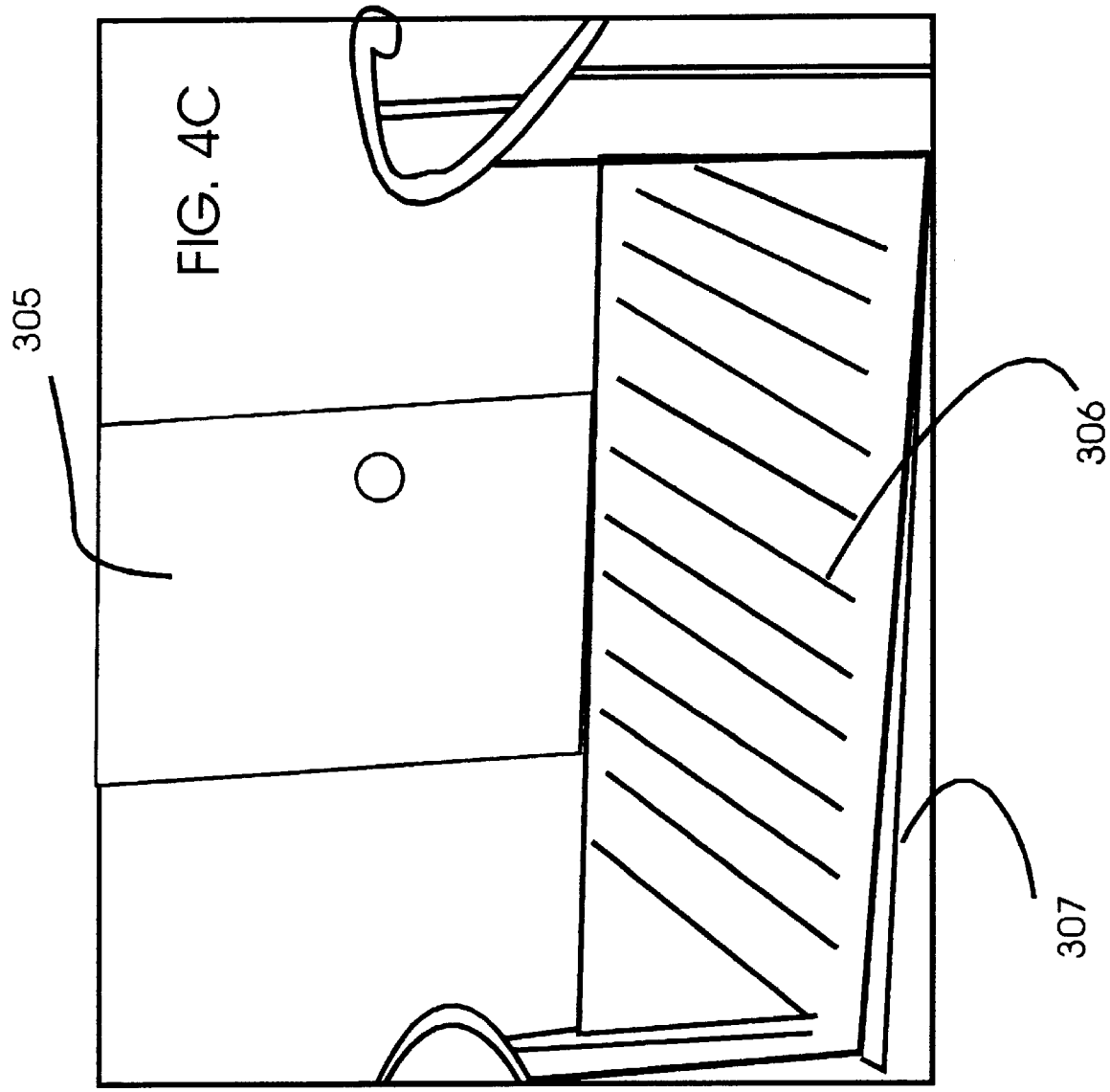

FIGS. 3A through 3C demonstrate that the property of "penetrability" of the virtual 3 dimensional object,such as a desk 201, a door 202 and a book case 203 as in FIG. 3A. The viewpoint of the viewer for this three dimensional workspace is 200 The property of "penetrability" can be stored in the software along with the properties that define the desk object itself. Thus the user's path of navigation to the door 204 FIG. 3B, allows the viewpoint to penetrate through the desk, as a property which is stored in the software along with the properties that define the desk 205 object. The trajectory of the viewpoint 207, FIG. 3C, toward the door 206, is unaffected by the presence of the desk.

This property of "penetrability", which can be stored in the software along with the properties that define a specific object such as the desk, is also considered to be unique behavior.

In contrast to FIGS. 3A–3C, FIGS. 4A through 4C, represent the embodiment of the instant application, "climbability". They demonstrate the property of "climbability" of the virtual 3 dimensional object, such as a staircase 300 of FIG. 4A, which can be can be stored in the software along with the properties that define the object itself. Thus the user's viewpoint 302 of FIG. 4A, comes into contact with the staircase object 300, on the path of navigation to reach a door 301 at the top of a staircase, the viewpoint automatically adjusts to simulate the behavior of climbing the stairs FIG. 4B, 304 to reach the door 303. This automatic viewpoint adjustment 307, FIG. 4C, continues and simulates the effect of climbing of the staircase 306 to reach the door 305 FIG. 4C.

FIG. 5 is the flowchart of the process implemented by the present invention for creating the effect of a climbing means to adjust the viewpoint. This flowchart defines the process that occurs when the user's viewpoint comes into contact with an object which has the properties of climbability or penetrability stored in the software along with the properties that define that object in 3-D workspace.

As a result, regarding climbability, the viewpoint will automatically be adjusted to simulate the behavior of climbing over the object to reach the desired position. Thus if the user's viewpoint comes into contact with, for example, a staircase object, on a navigation path through 3 dimensional workspace, while attempting to reach a door at the top of a staircase, the viewpoint automatically adjusts to simulate the behavior of climbing the stairs to reach the door viewpoint.

The process is started at FIG. 5, 50 and then the process involves the reading initial stored data for environmental, objects, and viewpoint 51. The process then proceeds to position A, at 52, a key point where information is fed into the display algorithm. This then followed by displaying the view of the environment with objects from prospective of the viewpoint, 53. and the process moves to position B, at 54, an address for input. At this point the process waits for user input 55. Upon receipt of input, the decision point 56 asks if a change in viewpoint is requested. If the answer is no, then the system processes other input and then goes to decision point 58 which asks if this is the end, if yes then the process ends at 60. If the answer is no, then the process returns to position B, at 54 and again awaits input at 55.

If the answer to 56 is yes then the next query is, does the viewpoint collide with an object 61. If no, then the process proceeds to position A at 52. If the answer is yes, then the process 63 checks the collision property of the object collided with. The process then asks whether the 3-D object is penetrable 64. If yes, the object is penetrated and the process proceeds to position A at 52. If the answer to 64 is no then the question is then asked 66, whether the object is climbable 66. If this answer is yes, then the viewpoint is adjusted to climb over the object 67 and then the process goes back to A at 52. If the answer to 66 is no, then the question 69 is raised is there another setting for view point possible. If yes, then the process proceeds to adjust the viewpoint as per other setting 70 and the process proceeds to A at 52.

Although certain preferred embodiments have been shown and described, it will be understood that many changes and modifications may be made therein without departing from the scope and intent of the appended claims.

We claim:

1. In a data processor controlled display system for displaying a virtual three-dimensional workspace having three-dimensional interactive objects within the workspace, means for displaying a portion of said workspace and the objects therein, viewer interactive means for navigating along paths in all three dimensions within said workspace to bring selected portions of said workspace into display, means for storing in association with each of a set of said objects, barrier means for intercepting any of said navigation paths heading toward intersection with any object of said set, and means responsive to said barrier means for diverting said navigation around it's said associated object.

2. In a data processor controlled display system for displaying a virtual three-dimensional workspace having three-dimensional interactive objects within the workspace, means for displaying a portion of said workspace and the objects therein, viewer interactive means for navigating along paths in all three dimensions within said workspace to bring selected portions of said workspace into display, means for storing in association with each of a set of said objects, barrier means for intercepting any of said navigation paths heading toward intersection with any object of said set, and means responsive to said barrier means for diverting said navigation path up and over it's said associated object.

3. The display system of claim 2, wherein the data representing each object and said associated barrier means are stored as a data entity.

4. The display system of claim 3 wherein said data entity is an object-oriented data entity.

5. The display system of claim 2, further allowing said viewer to navigate to any other of said three-dimensional object in said workspace, after the navigational path has climbed up and over said intersecting object.

6. The display system of claim 5 wherein said user can interact with said any of said three dimensional object.

7. A data processor controlled display method for displaying a virtual three-dimensional workspace having three-dimensional interactive objects within the workspace, comprising, displaying a portion of said workspace and the objects therein, employing a viewer interactive means for navigating along paths in all three dimensions within said workspace to bring selected portions of said workspace into display, providing a means for storing in association with each of a set of said objects, barrier means for intercepting any of said navigation paths heading toward intersection with any object of said set, and using a means responsive to said barrier means for diverting said navigation path around it's said associated object.

8. A data processor controlled display method for displaying a virtual three-dimensional workspace having three-dimensional interactive objects within the workspace, comprising, displaying a portion of said workspace and the objects therein, employing a viewer interactive means for navigating along paths in all three dimensions within said workspace to bring selected portions of said workspace into display, providing a means for storing in association with each of a set of said objects, barrier means for directing any of said navigation paths heading toward intersection with any object of said set, and using a means responsive to said barrier means for diverting said navigation path up and over it's said associated object.

9. The display method of claim 8, wherein the data representing each object and associated barrier are stored as a data entity.

10. The display method of claim 9 wherein said data entity is an object-oriented data entity.

11. The display method of claim 8, further allowing said viewer to navigate to any other of said three-dimensional object in said workspace, after the navigational path has climbed up and over said intersecting object.

12. The display method of claim 11, wherein said user can interact with said any other of said three dimensional objects.

13. In a computer readable program having data structures included on a computer readable medium which causes the display on a data processor controlled display of a virtual three-dimensional workspace, having three-dimensional interactive objects within the workspace, means for displaying a portion of said workspace and the objects therein, viewer interactive means for navigating along paths in all three dimensions within said workspace to bring selected portions of said workspace into display, means for storing in association with each of a set of said objects, barrier means for intercepting any of said navigation paths heading toward intersection with any object of said set, and means responsive to said barrier means for diverting said navigation path up and over it's said associated object.

14. The computer readable program of claim 13, wherein the data representing each object and associated barrier are stored as a data entity.

15. The computer readable program of claim 14 wherein said data entity is an object-oriented data entity.

16. The computer readable program of claim 13, further allowing said viewer to navigate to any other of said three-dimensional object in said workspace, after the navigational path has climbed up and over said intersecting object.

17. The computer readable program of claim 16, wherein said user can interact with said any other said three dimensional objects.

* * * * *